United States Patent [19]

Farinholt et al.

[11] Patent Number: 5,003,531

[45] Date of Patent: Mar. 26, 1991

[54] SURVIVABLE NETWORK USING REVERSE PROTECTION RING

[75] Inventors: Anthony P. Farinholt, Fairfax; John Lattyak, Reston; Blaine C. Readler, Sterling, all of Va.; Joseph F. Svacek, III, Escondido, Calif.

[73] Assignee: Infotron Systems Corporation, Cherry Hill, N.J.

[21] Appl. No.: 392,744

[22] Filed: Aug. 11, 1989

[51] Int. Cl.⁵ .................. H04L 1/00; H04J 3/14
[52] U.S. Cl. .................. 370/16.1; 370/13; 370/85.15; 370/16; 340/825.01; 340/825.05; 371/8.2
[58] Field of Search ............... 370/16, 85.12, 85.14, 370/85.15, 13, 16.1, 60, 60.1, 58.1, 58.2, 58.3; 340/825.01, 825.04, 827, 825.06; 371/8.2

[56] References Cited

U.S. PATENT DOCUMENTS

| | | |
|---|---|---|
| Re. 28,958 | 9/1976 | Zafiropulo et al. ............ 340/147 |
| 3,519,750 | 7/1970 | Beresin et al. ............ 179/15 |
| 4,354,267 | 10/1982 | Mori et al. ............ 371/11 |
| 4,435,704 | 3/1984 | Hashimoto et al. ............ 340/825.01 |
| 4,506,357 | 3/1985 | Nakayashiki et al. ............ 370/16 |
| 4,539,655 | 9/1985 | Trussell et al. ............ 364/900 |
| 4,542,496 | 9/1985 | Takeyama et al. ............ 370/16 |
| 4,573,044 | 2/1986 | McConachie et al. ............ 340/825.05 |
| 4,575,842 | 3/1986 | Katz et al. ............ 370/16 |
| 4,594,709 | 6/1986 | Yasue ............ 371/8 |
| 4,633,246 | 12/1986 | Jones et al. ............ 340/825.05 |
| 4,646,286 | 2/1987 | Reid et al. ............ 370/16 |
| 4,683,563 | 7/1987 | Rouse et al. ............ 370/16 |
| 4,696,001 | 9/1987 | Gagliardi et al. ............ 370/88 |
| 4,704,713 | 11/1987 | Haller et al. ............ 370/16 |
| 4,710,915 | 12/1987 | Kitahara ............ 370/16 |
| 4,752,924 | 6/1988 | Darnell et al. ............ 370/86 |
| 4,763,315 | 8/1988 | Nakayashiki et al. ............ 370/16 |
| 4,829,512 | 5/1989 | Nakai et al. ............ 370/16 |
| 4,835,763 | 5/1989 | Lau ............ 370/16 |
| 4,837,760 | 6/1989 | Reid et al. ............ 370/16 |
| 4,837,856 | 6/1989 | Glista, Jr. ............ 340/827 |

OTHER PUBLICATIONS

Wayne Ergle, "Survivable Network Systems", Northern Telecom One Ravinia Dr.—Suite 500, Atlanta, Ga. 30346, pp. 8.2.1–8.2.18.

Paul Langmeyer, "Fiber Optic Network Diversity", NEC America, Inc., Herndon, Va. 22071, pp. 8.3.1 to 8.3.19.

Primary Examiner—Benedict V. Safourek
Assistant Examiner—Alpus H. Hsu
Attorney, Agent, or Firm—Howson & Howson

[57] ABSTRACT

In a data communications network comprising a series of nodes connected by optical fiber links providing direct bidirectional communication between adjacent nodes, and communication between non-adjacent nodes in both directions through the same set of intermediate nodes, failure of a single link or of a single node is overcome by protection switching to a standby transmisison loop, including a standby link connecting the head end and tail end nodes of the series. The network provides survivability while also taking advantage of the ability of add/drop multiplexers to allow reuse of bandwidth. Rapid switchover to the protection loop is achieved by providing each node with the capability of detecting and responding to adjacent faults and, in normal operation, maintaining a high-speed by-pass path for the protection loop through all of the nodes except the head end node.

9 Claims, 5 Drawing Sheets

FIG 5

Prot. EAST Rx.

|  | DS3 YEL | AIS OOF CLOSS | PXS WXS | PXS WXR | PXR WXS | PXR WXR |
|---|---|---|---|---|---|---|
| DS3YEL | PF | PF | PF | PF | PF | PF |
| AIS, OOF, CLOSS | PF | PF | IU | AE | AE | AE |
| PXS/WXS | PF | IU | IU | IU | IU | IU |
| PXS/WXR | PF | AW | IU | IU | IU | IU |
| PXR/WXS | PF | AW | IU | IU | A | A |
| PXR/WXR | PF | AW | IU | IU | A | A |

Prot. WEST Rx.

PF — Protection Loop Failed
IU — Protection Loop In Use
A — Protection Loop Available
AW — Protection Loop Available in West direction
AE — Protection Loop Available in East direction
PXS — Protection X – bits Set
PXR — Protection X – bits Reset
WXS — Working X – bits Set
WXR — Working X – bits Reset

FIG 6

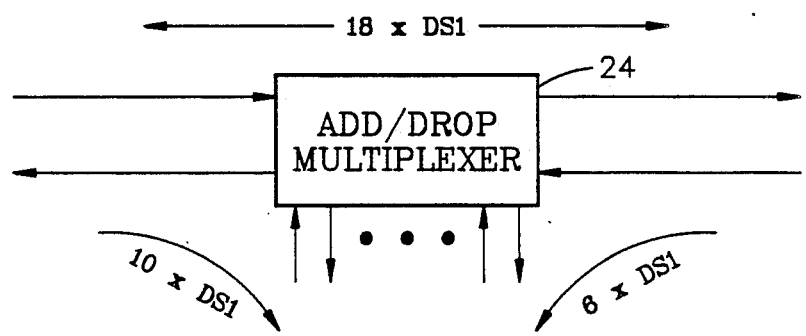

SURVIVABLE NETWORK USING REVERSE PROTECTION RING

BRIEF SUMMARY OF THE INVENTION

This invention relates to data communications networks, and particularly to the architecture of a novel network, comprising a series of nodes connected by links such as optical fiber links, which is capable of surviving both single link failure and single node failure.

Various forms of survivable networks have been suggested in the past. These include counterrotating rings, which are basically ring networks in which each node transmits signals in one direction (e.g. clockwise) around a loop through a working channel, and a protection channel is provided in order to transmit signals around the loop in the opposite direction in the event of a failure in the working channel. The operative portions of the working channel and protection channel are connected together in the nodes on opposite sides of the failure and the loop is in effect "folded back" on itself so that the signals travel in a newly formed continuous loop serving all the nodes.

One of the problems with a counterrotating ring network is that it is not able to reuse bandwidth. That is, each node must be capable of handling the entire bandwidth of the signals travelling in the ring.

Another problem with a counterrotating ring network is that, for communication in both directions between any two nodes, the total signal delay in one direction may be quite different from the total signal delay in the other direction, particularly when the protection channel is in use.

Contributing to the complexity of counterrotating ring networks is the fact that they generally rely on one particular node to serve as a controlling node for detecting faults, i.e. breaks in the working channel or faulty nodes, and for effecting reconfiguration of the working and protection channels into a folded loop.

In general, counterrotating ring networks are in the form of packet switching arrangements in which protection switching commands are sent, as packets, over the traffic-carrying channel, thus effectively reducing the bandwidth available for user packets.

The general object of this invention is to provide a simple and efficient means for protecting a communications network from complete breakdown when a transmission link, e.g. a fiber optic cable, between two nodes is cut, or when a failure occurs in one of the nodes. More specific objects include the more efficient and effective use of available bandwidth for communication in a survivable network, the achievement of rapid switch-over to a protection mode, and the avoidance of unequal delays in bidirectional communications between nodes.

The data communications network in accordance with the invention comprises a series of nodes including a first node, a last node, and at least one intermediate node located in the series between the first and last node. Each node has an input/output device for receiving data from, and sending data to, local terminals. The nodes of each adjacent pair of nodes in the series are connected to each other by a working transmission link, typically a pair of optical fibers, so that each intermediate node is directly connected to two adjacent nodes, and each of the first and last nodes is directly connected to an adjacent intermediate node. The working transmission links establish direct communication in both directions between adjacent nodes. They also establish communication between each pair of non-adjacent nodes, in both directions, through the same set of intermediate nodes. Standby transmission links are also provided for directly connecting the nodes of each adjacent pair of nodes in the series with each other so that each intermediate node is directly connected to two adjacent nodes. The standby transmission links also directly connect the first and last nodes with each other so that the standby transmission links form a ring or protection loop. Within each node, data is normally routed bidirectionally between the input/output device and the working transmission links. Data is also normally routed through each intermediate node from one adjacent node to the other adjacent node. Each node is also capable of passing through data in the standby transmission path. Switching is provided within each node so that, in the event of a link failure adjacent to the node, or failure of an adjacent node, data, intended to be passed on the working transmission path to another node in one direction through the failed link or node, is switched to the standby transmission path for routing toward said other node around the ring in the opposite direction.

The network of the invention typically comprises a head end node, a tail end node, and a series of intermediate nodes, all connected in series by optical fibers. Normally four fibers are used to connect adjacent nodes (or two fibers in the case of wavelength division multiplexing). One fiber pair of the four serves as the working transmission link, and the other fiber pair serves as the standby transmission link. The head end and tail end nodes are connected by a standby transmission link only, there being no need for a working transmission link directly connecting the head and tail nodes. The elimination of the need for a direct working transmission link between the head and tail nodes results in substantial savings in operating costs in some installations.

Unlike the counterrotating ring networks, which cannot reuse bandwidth, the network of this invention can make more efficient use of available bandwidth by the use of add/drop terminals at the nodes so that a channel carrying data between a first and second node can be reused, for example, to carry data between the second node and a third node.

The preferred network system of the invention utilizes time-division-multiplexing. In the packet switching systems typically used in counterrotating ring networks, internodal signals, including protection switching commands, are transmitted as packets in the single traffic-carrying channel. The time-division multiplexed system of this invention utilizes overhead bandwidth to carry all of the internodal signals needed to coordinate protection switching. Consequently, protection switching signals do not interfere at all with the efficient transmission of user traffic.

Each node has the capability of fault detection, of immediately assessing the condition of the protection loop, and of directly switching traffic within the node from the working path to the protection loop, without relying on signalling from a designated control node. Furthermore, the network is preferably designed so that, in normal operation, the protection loop passes directly through all but one of the nodes, normally the head end node, which serves as a protection loop idle generator, clocking data and framing onto the protection path. This arrangement allows for rapid switching of data onto the protection path in the event of a fault.

Because the network utilizes full duplex transmission and protection switching involves simultaneous switching of both directions of the full duplex path, the total signal delays in both directions are equal in both the normal and protection modes.

Further objects and advantages of the invention will be apparent from the following detailed description, when read in conjunction with the drawings.

BRIEF DESCRIPTION OF THE DRAWINGS

FIG. 5 is a table illustrating the manner in which protection loop availability is determined by each of the nodes in the network; and FIG. 6 is a schematic diagram illustrating the operation of the add/drop multiplexer which forms a part of each of the nodes.

DETAILED DESCRIPTION

Figure 1:
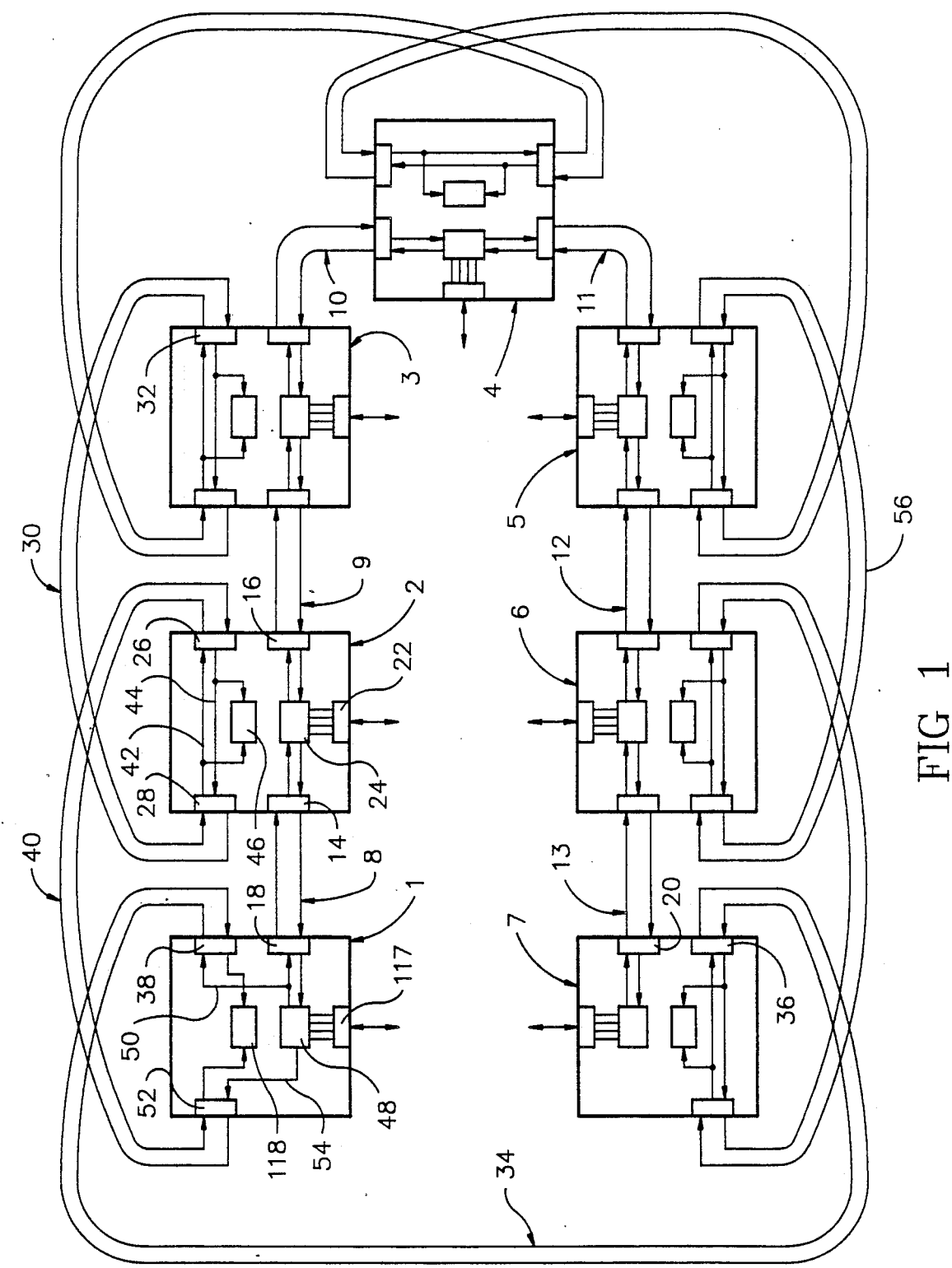
FIG. 1 is a schematic diagram of a typical data communications network in accordance with the invention, illustrating the normal mode of operation.

In FIG. 1, the network comprises seven nodes numbered 1–7 respectively. The nodes are connected in series by a working transmission path comprising two-way working links 8, 9, 10, 11, 12 and 13. Node 1, which is at one end of the series may be referred to as a "head end" node, and node 7, at the opposite end of the series may be referred to as a "tail end" node.

The working links can be radio links, wires, coaxial transmission lines, optical fibers, or other means for carrying signals over long distances. Typically, each working link will consist of a pair of optical fibers, one conducting data in one direction at a DS3 rate (45 megabit per second), and the other conducting data in the opposite direction at the same rate. Wavelength division multiplexing can be used, in which case each working link may consist of only a single fiber. Preferably the working links carry time-division multiplexed data in frames, each frame comprising 672 eight-bit time slots.

As used herein the term "east" refers to the clockwise direction through the series of nodes in FIG. 1, and the term "west" refers to the counterclockwise direction. Each of the intermediate nodes 2–6 has two high-speed interface modules for the working path, one designated a "west working" interface, and the other designated an "east working" interface. For example node 2 has a west working interface at 14 and an east working interface at 16. The head end node 1, as shown, has only an east working interface 18, and the tail end node 7 has only a west working interface 20. Where the working links are optical fibers, these interface modules both produce and receive modulated optical signals. In the case where wired or radio links are used, the interface modules produce and receive digital signals which are used to modulate an appropriate carrier. Communications between any two nodes take place on the working path bidirectionally from the east working interface of the western node to the west working port of the eastern node.

Each of nodes 1–7 also has a low speed port for input/output connection to local terminals and add/drop multiplexing circuitry for interconnecting the local terminals with the working transmission path. The low speed port for node 2 is indicated at 22, and the add/drop multiplexing circuitry for node 2 is indicated at 24. The add/drop multiplexing circuitry in each node includes an extractor for recovering clock signals and data from the received DS3 channel and for detecting out-of-frame conditions. It also includes control circuitry for dropping data to, and inserting data from, the low speed port.

The add/drop multiplexing circuitry in each node permits time slot reuse, as depicted in FIG. 6, in which the add/drop multiplexing circuitry of node 2 is shown passing through eighteen DS1 channels of a possible twenty-eight DS1 channels in a DS3 link, while dropping ten DS1 channels and adding six DS1 channels in the easterly direction through the low speed port 22 and dropping six DS1 channels and adding ten DS1 channels in the westerly direction. In the easterly direction, six of the ten dropped channels are reused, and in the westerly direction, all six of the dropped channels are reused.

With reference to FIG. 1, for example, if communication between a local terminal at node 2 and a local terminal at node 3 takes place over a given channel, the same channel may be reused for communication between another terminal at node 3 and a terminal at node 5.

Each of the nodes also has east and west protection interfaces, the east protection interface for node 2 being indicated at 26, and the west protection interface for node 2 being indicated at 28. These east and west protection interfaces are high speed interface modules similar to the working interface modules. The west protection interface 28 is connected through a standby transmission link 30, typically a pair of optical fibers, to the east protection interface 32 of node 3. The west protection interface of each node is similarly connected by a standby transmission link to the east protection interface of the node immediately to the east (i.e. the next node in the clockwise direction in FIG. 1). In addition, a standby link 34 connects the west protection port 36 of the tail end node 7 to the east protection port 38 of the head end node 1.

For any given node, bidirectional communication with another node to the east takes place through an "east" interface of the given node and a "west" interface of the other node. This is true whether communication is through the working path or through the protection path.

In normal operation of the network, as depicted in FIG. 1, the protection interfaces of each node, except for the head end node 1, are in a high speed by-pass configuration. That is, the received signal bypasses any portion of the node which would alter the information content of the signal. Clock and framing signals generated in head end node 1 are passed through the other nodes along the protection path. In node 2, for example, standby protection link 30 is connected to protection link 40 through by-pass paths 42 and 44 within node 2. Although in the interest of simple illustration, the by-pass paths are depicted in FIG. 1 as direct wired connections, it should be understood that the by-pass paths will normally comprise standard telecommunications repeaters. These repeaters recover the received signal and convert it into a digital domain (e.g. TTL or ECL) wherein it can be monitored. The signal is then converted back to the appropriate form (e.g. optical) for transmission out the other side of the node with the same information content as was received. A protection loop monitor 46 within node 2 monitors the status of both directions of the protection path. Each of the other nodes has a similar protection loop monitor.

At least in normal operation, when the protection loop is not required, high speed multiplexing circuit 48 in head end node 1 produces clock and framing signals which are delivered through line 50 to east protection interface 38 and sent through the protection path in a counterclockwise direction. These signals are also delivered to the working path through the east working interface 18. The west protection interface 52 also receives clock and framing signals through connection 54 from multiplexing circuit 48, which recovers clock and framing signals from the working path through east working interface 18. This clock and framing information received on the east side of the head end node 1 is originally generated in the high speed multiplexing circuitry of the tail end node 7. It is delivered through the west working interface 20 of the tail end node, and passed without alteration through the high speed multiplexing circuitry of each of the intermediate nodes on its way to east working interface 18 of the head end node.

With all of the nodes except for the head end node in a high-speed by-pass configuration, the protection loop is essentially ready to carry data in the event of a fault in one of the working links or in one of the nodes. Switching is only required in the two nodes on opposite sides of the fault, and in the head end node.

Figure 2:
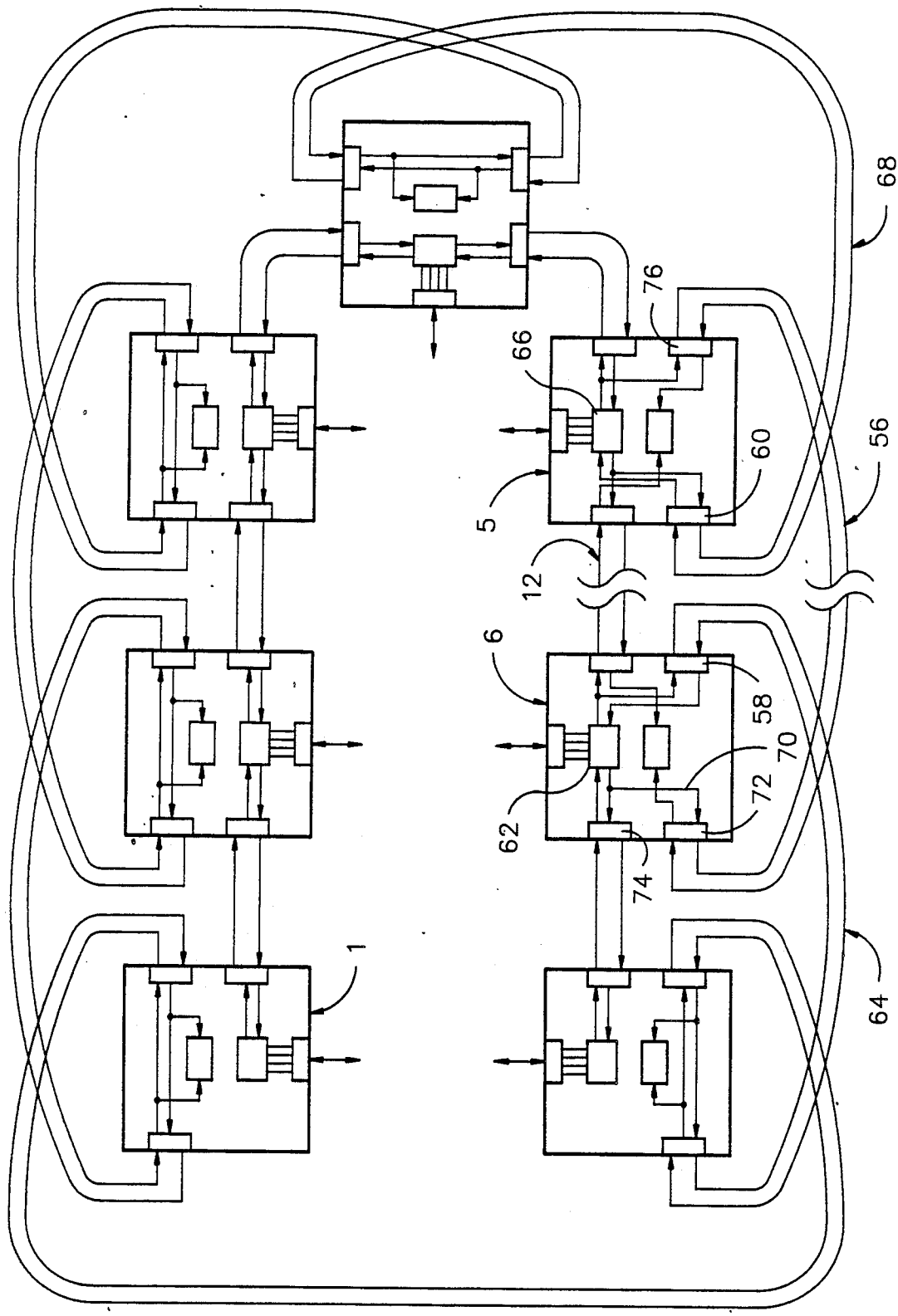
FIG. 2 is a schematic diagram showing the communications network in the protection mode.

Assuming, by way of example, that nodes 5 and 6 are connected by four co-sheathed optical fibers, two serving as the working link 12, and the other two constituting the protection link 56. If the optical cable is broken as shown in FIG. 2, switching immediately takes place in nodes 5 and 6 and in the head end node 1. Node 1 assumes a high-speed by-pass configuration, thereby completing the protection loop from high speed interfaces 58 and 60. Multiplexing circuit 62 in node 6 is switched so that it communicates with standby link 64 through port 58. Similarly multiplexing circuit 66 in node 5 is switched so that it communicates with standby link 68 through port 60. The eastbound transmit data from multiplexing circuit 62 in node 6 is connected by connection 70 to the east protection interface 72 as well as to the east working interface 74. Similarly, the westbound transmit data from multiplexing circuit 66 in node 5 is connected to the west protection interface 76 as well as to the west working interface. Connection 70 in node 6, and the corresponding connection in node 5, allow these two nodes to monitor the condition of standby link 56, which is not being used. This monitoring allows the equipment to notify maintenance personnel of the state of that link.

Figure 3:
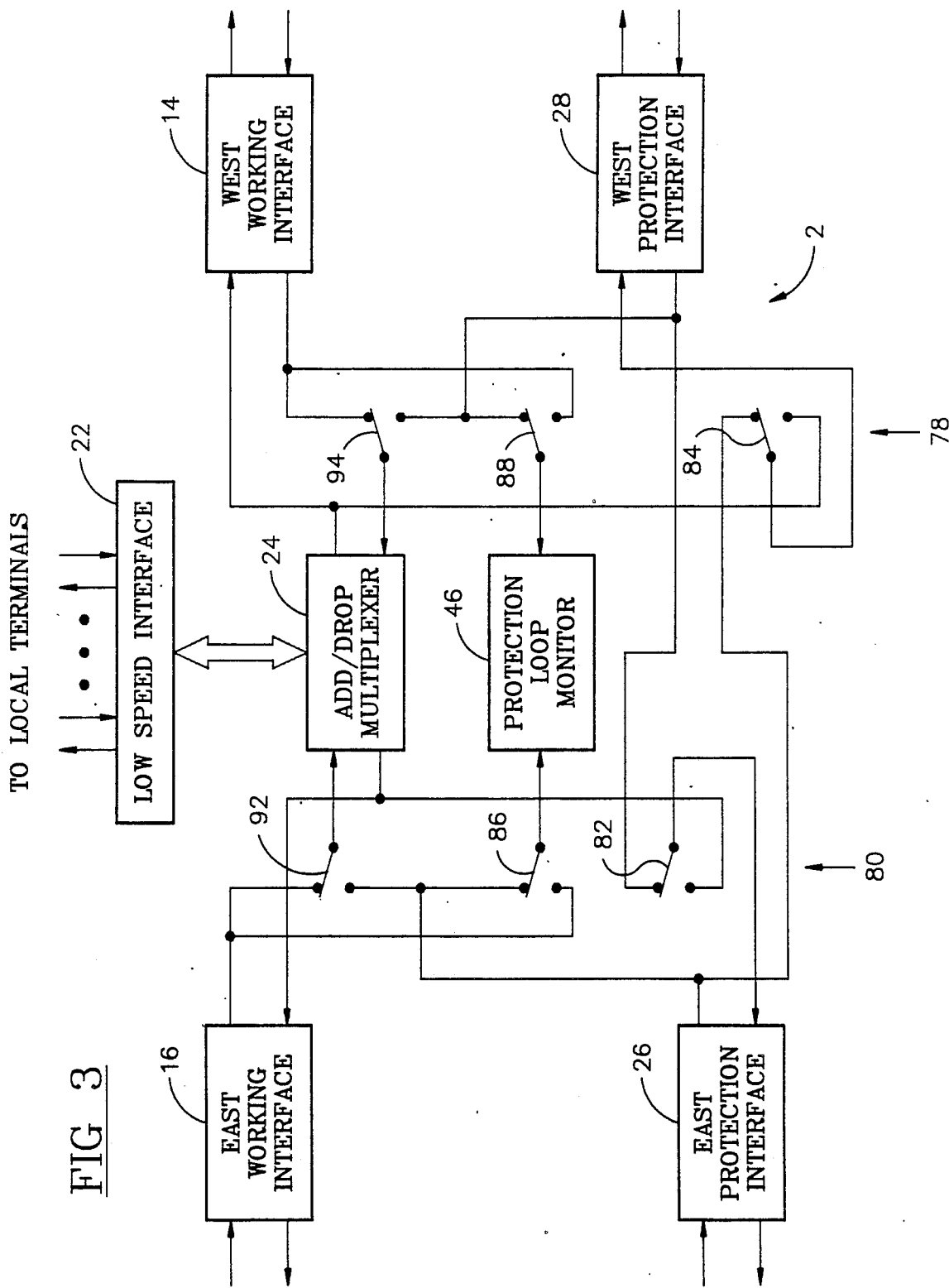
FIG. 3 is a schematic diagram illustrating, by conventional mechanical switches, the manner in which protection switching takes place in a typical intermediate node.

FIG. 3 shows in greater detail the manner in which protection switching takes place in intermediate node 2. The other intermediate nodes 3-6 are similar. Although switching is carried out electronically within the nodes by multiplexers under firmware or software control, in FIG. 3 mechanical switches are shown to facilitate understanding of the operations which take place in protection switching. In node 2, there are two similar sets, 78 and 80, of three single-pole, double throw switches. Set 78 comprises switches 84, 88 and 94, and set 80 comprises switches 82, 86 and 92. The switch sets 78 and 80 are shown in the condition in which the high speed by-pass is in effect between the east and west protection interfaces 26 and 28, respectively. Switches 82 and 84 provide the by-pass connection between the protection interfaces. Switches 86 and 88 connect the east and west protection interfaces respectively to the protection loop monitor 46. Switches 92 and 94 connect the signals received from the working path to the add/drop multiplexing circuit 24. When a fault is detected in the working link or in the node immediately to the west of the node of FIG. 3, switch set 78 is thrown to its opposite condition along with switch 82. Similarly, when a fault is detected in the working link or in the node immediately to the east of the node of FIG. 3, switch set 80 is thrown along with switch 84. It should be observed that switches 82 and 84 always operate together, whenever a protection switching operation takes place in the node, whether the fault is on the east side or the west side.

Because the switch sets are symmetrical, it is only necessary to consider the effect of a fault on one side of the node. Assuming a fault on the west side, switch set 78 is thrown along with switch 82. The signals from the add/drop multiplexer, previously intended for the west working interface 14, are switched to the west protection interface 28 by switch 84. At the same time, signals received by the west protection interface 14 are connected by switch 94 to the add/drop multiplexing circuitry 24. Switch 88 connects the west input of the protection loop monitor 46 to the west working interface 14. Switch 82 connects the high speed multiplexer 24 to the transmit path of the east protection interface 26, placing transmit data on the standby link between the nodes on either side of the fault to permit monitoring. This connection corresponds to connection 70 in node 6 of FIG. 2. Thus, when switch set 78 and switch 82 are thrown, the condition of the node is the same as the condition of node 6 in FIG. 2. Similarly, when switch set 80 is thrown, the condition of the node is the same as the condition of node 5 in FIG. 2.

Switching in tail node 4 is similar to that shown in FIG. 3, except that there is no east working interface and no need for switches corresponding to switch set 80.

Figure 4:
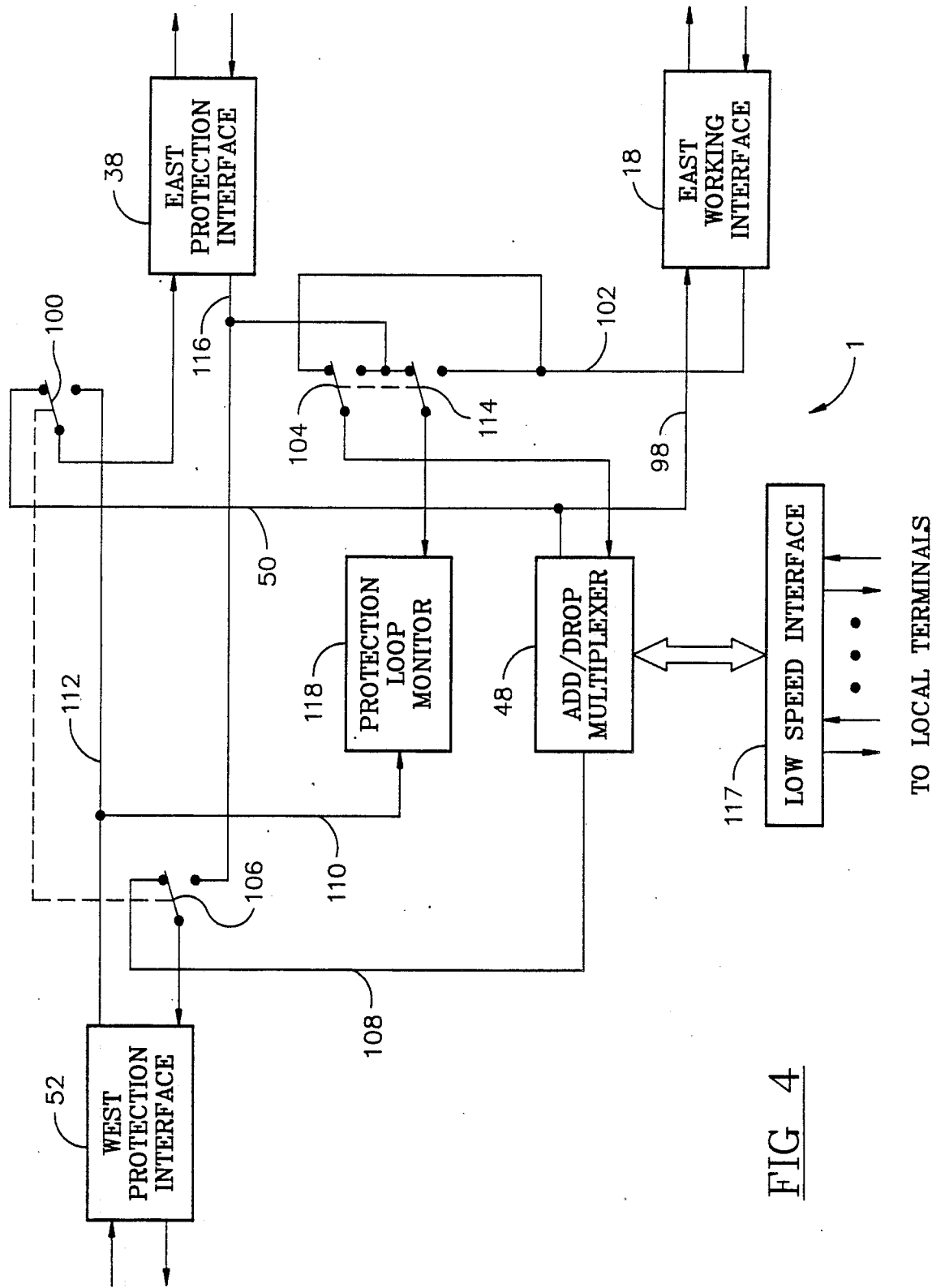
FIG. 4 is a schematic diagram illustrating the manner in which protection switching takes place in a typical head end node.

The head end node is depicted in FIG. 4 in its normal condition, when no protection switches are active in the network. Again, although switching is carried out electronically by firmware-controlled or software-controlled multiplexers in the head end node, mechanical switches are shown to facilitate understanding of the protection switching which takes place at the head end. Its add/drop multiplexing circuit 48 feeds clock and framing signals to the east working and protection interfaces simultaneously through line 98 and the combination of line 50 and switch 100. The add/drop multiplexing circuit receives data from the east working interface 18 through line 102 and switch 104. The add/drop multiplexer is connected to the west protection interface 52 through switch 106 and line 108. The protection loop monitor is connected to the west protection interface through lines 110 and 112, and to the east protection interface through switch 114 and line 116. A low speed interface 117 connects the add/drop multiplexer 48 to the local terminals at node 1, and is similar to low speed interface 22 in FIGS. 1 and 3.

In the event of a fault in the working link 8 immediately to the east of the head end node 1, or a fault in the adjacent node 2, switches 104 and 114 are thrown, thereby connecting incoming data at the east protection interface to the add/drop multiplexer through switch 114, and connecting the protection loop monitor 118 to the receive line 102 from the east working interface rather than to the receive line 114 of the east protection interface. Switches 100 and 106 remain in the condition shown. Communication takes place between node 1 and another node, node 5 for example, through standby transmission link 34 (FIG. 1), and over the protection loop through high-speed by-pass connections in nodes 7, 6, 5 and 4 (and also 3 if the fault is in transmission link 8 rather than in node 2), and then through the first node to the east of the fault (which will assume the condition of node 6 in FIG. 2, and the intact portion of the working transmission path to node 5.

Referring again to FIG. 4, in the event of a fault elsewhere in the system, i.e. other than in node 2 or the link between nodes 1 and 2, switches 104 and 114 remain in the condition shown, and switches 100 and 106 are thrown, causing a high-speed by-pass path to be formed in node 1 for the protection loop. The nodes on either side of the fault then provide clock and framing signals to the protection loop.

Before a node can perform a protection switch, it must determine if the protection loop is available. Only two nodes can be switched to the protection loop at any time. All of the other nodes must be in the high-speed by-pass configuration. The protection loop monitor in each node continuously checks the frames passing on the protection loop for DS3 "yellow" alarms (DS3 YEL), alarm indication signals (AIS), out of frame conditions (OOF) and carrier loss (CLOSS). In addition, it monitors the condition of switching information bits in the frames passing on the protection loop. In the case of a DS3 system, the switching information is contained in the X bits of the DS3 M-frame, which are normally in a reset state.

As shown by the table in FIG. 5, the protection loop is available in both directions when the protection loop has carrier and valid frame, no yellow alarm or AIS conditions in either direction, and the switching information bits (or X bits) in both directions are in the reset state. Since the protection loop is continuous through all of the nodes, the existence of these conditions at any one node implies the existence of the same conditions at all of the nodes, and therefore the availability of the protection loop at all of the nodes. When two nodes have seized the protection loop, switching information bits will be set in both directions, signalling that the protection loop is in use and preventing more than two of the nodes from simultaneously routing data to the protection loop.

In the event of a failure of a working link in one direction, e.g. a single fiber failure, a control circuit in the multiplexing circuitry of the node receiving signals over the failed link will cause switching to take place within the node. The switching information bits (X bits) will be set and transmitted on both the working path and on the protection path. For example, if a failure occurs in the eastbound channel of the working link immediately to the west of the node shown in FIG. 3, a control circuit within add/drop multiplexer 24 causes switching information bits to be set. If the protection monitor determines that the protection loop is available, the multiplexer is switched to the west protection interface, and the set switching information bits are transmitted over the protection loop to the node at the other side of the fault. At this other node, if the switching information bits are detected as set for two consecutive scanning cycles, the other node executes a switch (on its east side) to the protection loop.

The head end node also monitors the protection loop. When it receives switching information bits in the set condition from either direction, it switches to the by-pass mode, i.e switches 106 and 100 in FIG. 4 operate. The head end node continues to monitor the protection loop, and reverts to its original condition, generating idle clock and framing signals in the protection loop, when it receives reset switching information bits in both directions, or detects a carrier loss or alarm indication signal in both directions in the protection loop. Thus, if a failure occurs in the working path, causing protection switching to occur, a failure occurs subsequently in the protection loop, and the working path failure is repaired, the head end will revert to idle generation, permitting protection loop monitors to locate the faulty link of the protection loop.

One problem with using the state of the switching information bits to initiate protection switching is that the same bits are also used to indicate that the protection loop is in use. Thus, when a node detects switching information bits in the set condition on the working path, it checks the status of the switching information bits on the protection path for the last two scanning cycles. If these bits have been set for both of the last two scanning cycles, no protection switching should occur because the protection loop is already in use. If the bits have been reset during the last two scanning cycles, however, it is assumed that the protection loop is available and that protection switching should take place.

Since the protection loop will most likely be a physically longer path, and the setting of the switching information bits will be delayed by the switching of the idle generating node (the head end node) to the by-pass condition, normally there will be no confusion as to whether the set bits are calling for a protection switch or merely indicating that the protection path is in use. One exception is that if the failure occurs on the transmit portion of the working link connected to the idle generating node (normally the head end node), the setting of the switching information bits will not be delayed by the switching of the node to the by-pass condition. Thus, when the bits are detected set on the working path, they will also be detected as set on the protection path.

To resolve this problem, the switching information bits in the protection loop are checked every DS3 scan cycle. If they are set for three consecutive cycles, the protection loop is flagged as "in use" in a database maintained by the protection loop monitor in each of the nodes. The "in use" flag is reset immediately if the switching information bits are detected in the reset state. When the switching information bits on the working path are detected as set for two consecutive scan cycles, the "in use" flag is consulted, and protection switching occurs only if the protection loop is not in use.

In the event of a failure of a working link in both directions, the adjacent nodes, between which the failed link resides, will detect some type of failure indication, e.g. carrier loss, loss of framing, or high bit error rate. The two nodes will independently initiate protection switching within themselves. The activities which occur during this protection switching are analogous to the switching described in the preceding section on single direction working link failure, except that both nodes will behave just as the node which initiated the protection switching in the single direction failure scenario.

Especially in the case of fiber optic links, the working fibers and the standby fibers will normally be co-sheathed, and physical damage to one or both of the working fibers will likely be accompanied by damage to the standby fibers in the same link. As will be apparent from FIG. 2, even if the standby link (56) is damaged along with damage to the working link (12), the system will survive the failures, and communications between all of the nodes will be maintained.

Failure of any one node will be handled by the system in the same way as failure of a link between adjacent nodes. Protection switching will take place within the two nodes on opposite sides of the failed node, and communication which would otherwise take place through the failed node will take place through the protection path.

As will be apparent from the foregoing, the protection scheme has a number of important advantages over prior protection schemes, in particular its simplicity and reliability, its ability to make more efficient use of available bandwidth through the use of add/drop multiplexers, its ability to achieve rapid protection switching by virtue of the maintenance of the protection loop in a high-speed by-pass path through all but one of the nodes and the elimination of the need for a controlling node, and its ability to avoid unequal delays in bidirectional communications between nodes.

Numerous modifications can be made to the apparatus disclosed. For example, many of the advantages of the invention can be realized in a network in which the working path is a continuous ring, i.e. a working link is provided between the head and tail end nodes. The number of nodes and the types of links used in the network can be varied, and many other modifications can be made without departing from the scope of the invention as defined in the following claims.

We claim:

1. A data communications network comprising:
    a series of nodes, said series comprising a first node, a last node, and at least one intermediate node located in the series between the first and last node, each of said nodes having input/output means for receiving data from, and sending data to, local terminals;
    working transmission link means connecting the nodes of each adjacent pair of nodes in the series with each other whereby each intermediate node is directly connected to two adjacent nodes, and each of the first and last nodes is directly connected to an adjacent intermediate node, said working transmission link means establishing direct communication in both directions between adjacent nodes and establishing communication between each pair of non-adjacent nodes, in both directions, through the same set of intermediate nodes;
    standby transmission link means directly connecting the nodes of each adjacent pair of nodes in the series with each other whereby each intermediate node is directly connected to two adjacent nodes and also directly connecting the first and last nodes with each other whereby the standby transmission link means forms a ring;
    means within each node for normally routing data bidirectionally between the input/output means and the working transmission link means;
    means within each intermediate node for normally routing data through the intermediate node from one adjacent node to the other adjacent node;
    means within each one of the nodes connectable to route data bidirectionally in the standby transmission link means through said one of the nodes; and
    switching means within each node, said switching means within the pair of nodes on opposite sides of any portion of the network in which a failure occurs being operable to route data, intended to be passed from one node of the last-mentioned pair to the other node of the last-mentioned pair on a portion of the working transmission link means extending in one direction around the ring to a portion of the standby transmission link means extending around the ring in the direction opposite to said one direction, and said portion of the standby transmission link means providing a path extending from said one node of the last-mentioned pair to said other node of the last-mentioned pair, for carrying the last-mentioned data to said other node of the last-mentioned pair.

2. A data communications network according to claim 1 in which the working transmission link means and standby transmission link means are optical fibers.

3. A data communications network according to claim 1 in which the working transmission link means comprises, for each intermediate node, a first pair of optical fibers extending from the intermediate node to one of its adjacent nodes and a second pair of optical fibers extending from the intermediate node to the other of its adjacent nodes.

4. A data communications network according to claim 1 in which the standby transmission link means comprises, for each intermediate node, a first pair of optical fibers extending from the intermediate node to one of its adjacent nodes and a second pair of optical fibers extending from the intermediate node to the other of its adjacent nodes, and a pair of optical fibers extending from the first node to the last node.

5. A data communications network according to claim 1 in which the first and last nodes are connected directly only by the standby transmission link means.

6. A data communications network according to claim 1 in which the input/output means at least at one of the nodes comprises multiplexer and demultiplexer means for receiving data from and transmitting data to a plurality of local terminals.

7. A data communications network according to claim 1 in which the input/output means at least at one of the nodes comprises means for inserting data from, and dropping data to local terminals, whereby signals on a portion of the working transmission link means on one side of the last-mentioned one of the nodes are able to reuse bandwidth occupied by signals on another portion of the working transmission link means on the opposite side of said last-mentioned one of the nodes.

8. A data communications network according to claim 1 including means for permitting the switching means in two of the nodes to route data simultaneously to the standby transmission link means, but preventing the switching means in more than two of the nodes from simultaneously routing data to the standby transmission link means.

9. A data communications network according to claim 1 in which said means within each one of the nodes, connectable to route data bidirectionally in the standby transmission link means through said one of the nodes, comprises high speed by-pass means.

* * * * *